United States Patent [19]

Salama

[11] Patent Number: 4,589,801
[45] Date of Patent: May 20, 1986

[54] COMPOSITE MOORING ELEMENT FOR DEEP WATER OFFSHORE STRUCTURES

[75] Inventor: Mamdouh M. Salama, Ponca City, Okla.

[73] Assignee: Conoco Inc., Ponca City, Okla.

[21] Appl. No.: 631,127

[22] Filed: Jul. 16, 1984

[51] Int. Cl.[4] .............................................. E02B 17/00
[52] U.S. Cl. .................................. 405/224; 405/195; 405/204; 156/173
[58] Field of Search ........ 405/224, 225, 195, 203-209; 156/173; 114/264, 265

[56] References Cited

U.S. PATENT DOCUMENTS

| | | | |
|---|---|---|---|
| 3,974,012 | 8/1976 | Hogarth | 156/173 X |
| 4,023,835 | 5/1977 | Ewing et al. | 156/173 X |
| 4,119,748 | 10/1978 | Verbauwhede et al. | 156/173 X |
| 4,171,626 | 10/1979 | Yates et al. | 156/173 X |
| 4,226,555 | 10/1980 | Bourne et al. | 405/224 |
| 4,238,539 | 12/1980 | Yates et al. | 156/173 X |
| 4,248,549 | 2/1981 | Czerewaty | 405/224 |

*Primary Examiner*—Dennis L. Taylor
*Attorney, Agent, or Firm*—Stephen A. Littlefield

[57] ABSTRACT

Lightweight mooring elements for tension leg platforms are formed of a carbon fiber/epoxy matrix material. The mooring elements are preferably in tubular form and include metallic end connectors for interconnecting a plurality of tubular members to form the mooring element. Optionally, the composite structure further includes aramid or glass fibers which increase the resistance of the mooring element to impact damage.

14 Claims, 6 Drawing Figures

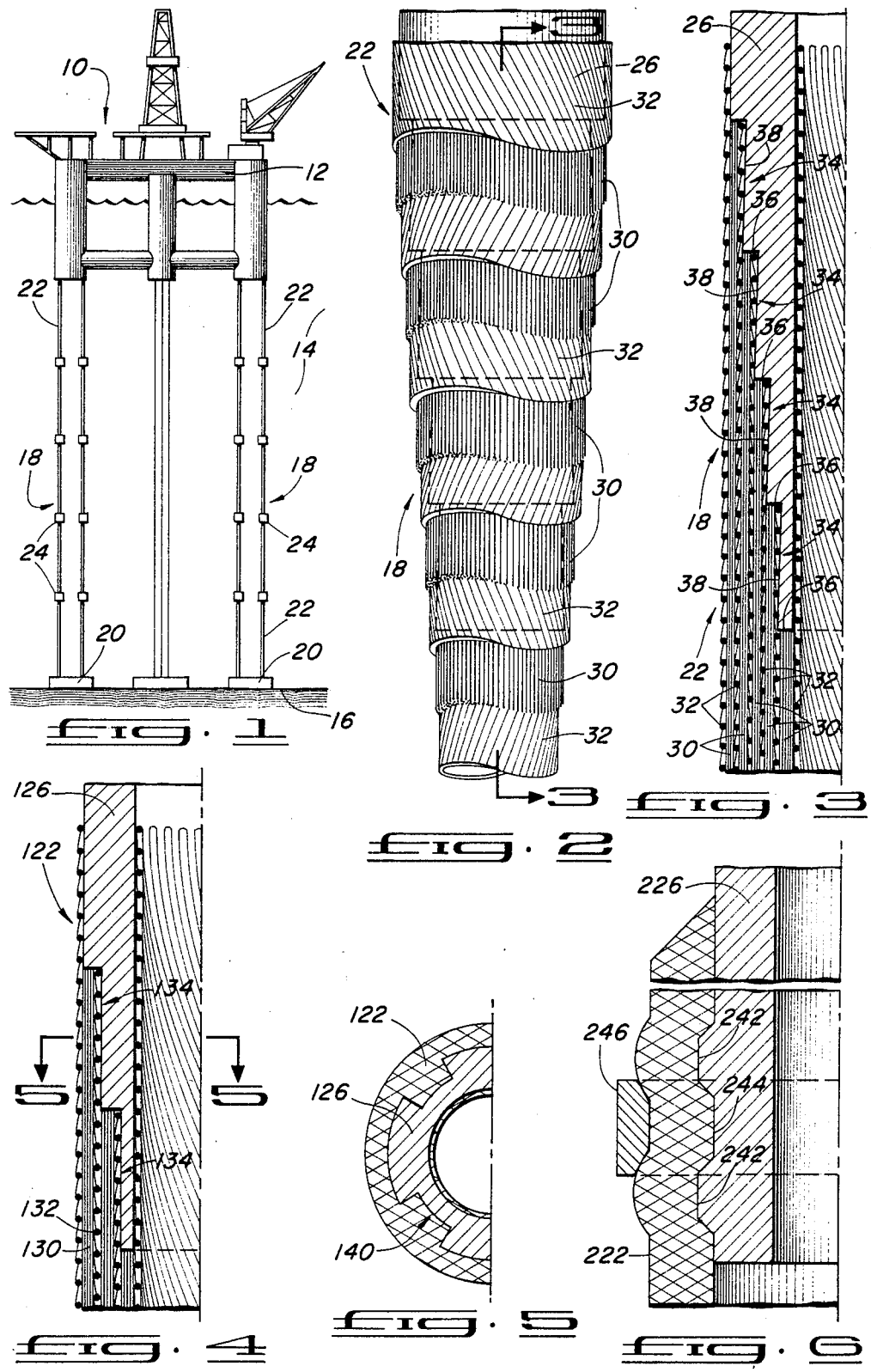

COMPOSITE MOORING ELEMENT FOR DEEP WATER OFFSHORE STRUCTURES

This invention relates to the art of floating offshore structures such as tension leg platforms and, more particularly, to a lightweight, composite material for use in deep water as a mooring element for such offshore structures.

BACKGROUND OF THE INVENTION

With the gradual depletion of subterranean and shallow subsea hydrocarbon reservoirs, the search for additional petroleum reserves is being extended to deeper and deeper waters on the outer continental shelves of the world. As such deeper reservoirs are discovered, increasingly complex and sophisticated production systems have been developed. It is projected that by the year 1990, offshore exploration and production facilities will be required for probing depths of 6,000 feet or more. Since bottom founded structures are generally limited to water depths of no more than about 1,500 feet because of the shear size of the structure required, other, so-called compliant structures have been developed.

One type of compliant structure receiving considerable attention is a tension leg platform (TLP). A TLP comprises a semisubmersible-type floating platform anchored by piled foundations on the sea bed through vertical members or mooring lines called tension legs. The tension legs are maintained in tension at all times by insuring that the buoyancy of the TLP exceeds its operating weight under all environmental conditions. The TLP is compliantly restrained in the lateral directions allowing sway, surge, and yaw while vertical plane movements of heave, pitch and roll are stiffly restrained by the tension legs.

Several major aspects of the design of the complaint structure concept are developed from dynamic considerations of the structure due to excitation by water waves. To minimize sway motions, the natural sway period of the structure must be either less than or greater than the wave periods at the various sea states. A stiff structure such as a fixed platform is designed with a natural sway period which is less than the wave period. However, the natural sway period of fixed platforms increases with increasing water depths and ultimately approaches the wave period resulting in large platform motion. In a compliant structure such as a TLP, the natural sway period is designed to be greater than the wave period.

Current TLP designs utilize heavy walled steel tubulars for the mooring elements. These tension legs constitute a significant weight with respect to the floating platform, a weight which must be overcome by the buoyancy of the floating structure. It should be readily apparent that, with increasingly long mooring elements being required for a tension leg platform in deeper and deeper waters, a floating structure having the necessary buoyancy to overcome these extreme weights must be so large as to be uneconomic. Further, the handling equipment for installing and retrieving the long, heavy tension legs adds excessive weight and complexity to a tension leg platform system. Floatation systems can be utilized but their reliability is questionable. In addition, they cause an increase in the hydrodynamic forces on the structure.

SUMMARY OF THE INVENTION

The present invention provides for lightweight materials which may be used in place of heavy, thick-walled steel tubulars as mooring elements in deep water tension leg platforms.

In accordnace with the invention, a lightweight mooring element for deep water offshore structures comprises a tubular composite of longitudinally disposed high modulus carbon fibers in a resin matrix.

Further in accordance with the invention, the above-described composite mooring element further includes metallic coupling members bonded at the ends of each section of the mooring element.

Still further in accordance with the invention, the above-described composite mooring elements further include longitudinally or helically disposed glass or aramid fibers.

It is therefore, an object of this invention to provide a tensioned mooring element for a tension leg platform which is lighter in weight but offering equal or greater strength and stiffness when compared to tubular steel mooring elements which have been used previously.

It is a further object of this invention to provide a means whereby a tension leg platform may be utilized in waters in excess of 1,000 feet and avoiding an uneconomically oversized platform and complicated floatating and handling equipment which would otherwise be required if prior tubular steel mooring elements were utilized.

BRIEF DESCRIPTION OF THE DRAWINGS

These and other objects of the invention are accomplished through the manner and form of a present invention to be described hereinafter in the more limited aspects of preferred embodiments thereof and illustrated in the accompanying drawings forming a part of this specification and in which:

FIG. 1 is a schematic view of a tension leg platform in which the composite mooring elements of the present invention may be incorporated;

FIG. 2 is an elevational view in partial section of the composite mooring element of the present invention showing various layers of composite material;

FIG. 3 is a cross-sectional view of the mooring element in FIG. 2 taken along lines 3—3;

FIG. 4 is a cross-sectional view similar to FIG. 3 showing an alternative embodiment of the invention;

FIG. 5 is a cross-sectional view of the embodiment shown in FIG. 4 taken along lines 5—5 thereof; and, FIG. 6 is a cross-sectional view similar to FIGS. 3 and 4 showing yet another alternative embodiment of the invention.

DETAILED DESCRIPTION OF THE PREFERRED EMBODIMENTS AND THE DRAWINGS

Referrring now to the drawings wherein the several figures are presented for illustrating a preferred embodiment of the invention only and not for the purpose of limiting the scope of the invention, FIG. 1 shows an offshore tension leg platform 10. The TLP 10 generally comprises a platform 12 floating in a body of water 14 and which is anchored to the bottom 16 of the body of water by a plurality of tensioned mooring elements 18 which extend between the floating platform 12 and anchoring means 20 which are located on the bottom 16 of the body of water 14. The anchoring means 20 are adapted for connection of a plurality of tensioned mooring elements 18 and are secured in position by a plurality of pilings extending into the bottom 16.

In accordance with one preferred embodiment of the invention, the tensioned mooring elements 18 comprise a plurality of lightweight composite tubulars 22 which are interconnected at their ends by a plurality of metallic connector means 24, the tensioned mooring elements 18 being maintained in constant tension between the anchoring means 20 and the floating platform 12 by buoyancy of the floating platform 12 which is constantly maintained in excess of its operating weight under all conditions.

As shown in FIG. 2, in accordance with one preferred embodiment of the invention, a mooring element 18 generally comprises a tubular composite structure 22 and a metallic connector 26 disposed at each end thereof. The metallic connector 26 may be of a threaded design or merely welded in order to form the connector means 24 shown in FIG. 1. In accordance with the invention, the composite tubular portion 22 of the mooring element 18 comprises a plurality of layers of generally longitudinally extending reinforcing fibrous material. In its preferred form, a plurality of parallel-lay high modulus carbon fiber layers 30 in a thermoset or thermoplastic resin matrix are alternated with layers 32 of high strength, low twist angle, helically wound aramid fibers in the same resin matrix. It will be understood that a mooring element 18 may be constructed solely of carbon fibers in a resin matrix in either parallel-lay or low-angle helical twist without the use of interspersed layers of aramid fiber, the aramid fiber being present in the preferred form in order to increase the toughness and damage resistance of the mooring element 18 over the otherwise somewhat brittle carbon fiber/resin composite structure. In its preferred form, the carbon fibers have an elastic modulus in excess of 30 million psi.

In the cross-sectional view of the mooring element 18 shown in FIGS. 2 and 3, the layered form of the tubular composite structure 22 and one preferred form of metal connector 26 are shown. As can be seen, a plurality of alternating layers of longitudinally oriented carbon fibers 30 and helically wound aramid fibers 32 all in an epoxy matrix form the tubular composite 22. It will be understood that the size and number of layers of carbon fiber and aramid fiber may be varied to provide the desired strength and stiffness in the mooring element 18.

The preferred metal connector 26 has a generally radially stepped form to which the various layers 30, 32, of fibrous materials are bonded. In their preferred form, the steps 34 of the metal connector 26 have a slight reverse taper extending longitudinally away from the tubular composite portion of the mooring element 18 in order to increase the strength of the connection for increased axial loading capacity. Also as illustrated in FIG. 3, the end portions of the carbon fibers abut against the radially oriented faces 36 of the steps 34 whereas the helically wound aramid fiber layers 32 overlay the land faces 38 of the steps 34. As stated previously, the metal connector may be provided with threads in order to engage coupling means for interconnection with various other components of the mooring element 18 or may include portions which may be conveniently welded to other components.

FIGS. 4 through 6 depict alternative embodiments of a metal connector portion associated with a tubular composite structure 22 to form a mooring element 18. Thus, FIGS. 4 and 5 illustrate an alternative metal connector 126 which provides greater resistance to torsional loadings on the bond between the composite structure 122 and the metal connector 126. Longitudinally oriented slots 140 are provided in the steps portions 134, the slots 140 providing a locking mechanism against torsional forces which would tend to shear the bond between the metal connector 126 and the composite structure 122. Otherwise, the composite structure 122 is formed of alternating layers of carbon fiber 130 and aramid fiber 132 in a resin matrix as with previously described embodiments.

FIG. 6 shows yet another type of metal connector 226 which is bonded to a fiber composite 222 formed in a manner similar to previous embodiments. The metal connector 226 is provided with a plurality of radially extending enlarged circumferential ring portions 242 defining an intermediate grooved portion 244 of lesser diameter. The composite structure 222 conforms to the ring portions 242 and is compressed into the grooved portion 244 by the action of a split ring 246 encircling the exterior of the composite structure 222 in a clamping manner. While only two rings 242 and a single groove 244 and clamp ring 246 are shown in FIG. 6, it will be understood that a plurality of such structures may be provided in order to increase the strength of the connection between the metal connector 226 and the composite structure 222.

As stated previously, the aramid fiber portion of the composite structure is provided to increase the resistance of the mooring element to impact damage which would cause the mooring element to fail. As an alternative to or in addition to the provision of aramid fiber layers, other protective means may be provided on the exterior of the mooring elements, particularly covering the composite portion of the structure which afford additional impact protection to the mooring elements. This includes encasing the mooring element in a resilient, rubber-like material or even a metal sheath. It will be understood however, that the provision of such additional impact resistance material has the disadvantage of a weight penalty on the otherwise lightweight structure. As an alternative to aramid fibers, glass fibers may be used to strengthen the composite.

In forming the composite structure, several known techniques may be used such as pultrusion, filament winding, and molding. In pultrusion, the reinforcing fibers which are wetted with uncured resin are pulled through a heated die where the composite is cured. A continuous length of composite is produced as it is pulled from the die. This technique is useful for the fabrication of bars, rods, tubes, I-beams and other elements of long length having constant cross-section. Although different fiber orientations can be pultruded, the easiest configuration is a zero degree composite (longitudinally oriented fibers).

In filament winding, the reinforcing fiber is wound on a mandrel in a helical, circumferential, or polar (end-to-end) pattern repeatedly to form the composite structure. The resulting structure is then cured in an oven. Filament winding machines are available to produce large composite parts. This technique is useful for the fabrication of generated shapes such as rings, cylinders, and pressure vessels, even of variable cross-sectional. Wet filament winding involves wetting the fibers with uncured resin before winding on the mandrel. Dry filament winding or tape winding employs "prepreg" tapes of approximately one inch width. "Prepreg" tapes or sheaths are fibers preimpregnated with uncured resin and are more expensive than fibers and resin purchased separately. Winding of dry fibers with subsequent resin injection is also possible.

The mandrels on which windings are performed can be of varying cross-section. Integral metallic end fittings may be easily incorporated into a filament wound product. Various fibrous orientations except zero degrees can be achieved by filament winding. Zero degree plies may be provided as prepregs which are laid up by hand. Alternatively, a longitudinal lay-down method may be used whereby zero degree fibers are laid on a mandrel while being captured by a 90° outer wrap.

In molding, sheets of composite prepregs are cut and laid up in a metallic mold or matched die. A vacuum bag may be deployed over the composite to minimize the void content. A hot press or autoclave is then used to provide the desired temperature and pressure cycles for proper curing of the composite structure. This technique is useful for the fabrication of flat plates and fairly simple large panels.

As shown in the drawings, the mooring elements 18 may be comprised of a plurality of sectional tubular composite matters of any length convenient for handling. Alternatively, it will be understood that such a composite could be formed as a single, one-piece structure extending from the subsea anchor 20 to the floating platform 12. However, for the convenience of handling, shorter segments may be preferred.

While the invention has been described in the more limited aspects of a preferred embodiment thereof, other embodiments have been suggested and still others will occur to those skilled in the art upon the reading and understanding of the foregoing specification. It is intended that all such embodiments be included within the scope of this invention as limited only by the appended claims.

Having thus described my invention, I claim:

1. In a floating tension leg platform wherein a plurality of substantially vertically oriented, tensioned axially mooring elements are connected so as to be constantly in tension between anchoring means located on a sea bottom and said floating platform, the improvement which comprises said mooring elements axially tensioned being a composite structure of a plurality of longitudinally oriented carbon fibers imbeded in a resin matrix.

2. The improvement as set forth in claim 1 wherein said mooring elements axially tensioned are in sections and have metallic connectors disposed between said sections.

3. The improvement as set forth in claim 2 wherein said mooring elements axially tensioned are tubular in cross-section.

4. The improvement as set forth in claim 2 wherein said metallic connectors are threaded for interconnection.

5. The improvement as set forth in claim 2 wherein said metallic connectors are welded together.

6. The improvement as set forth in claim 1 wherein said carbon fibers have a parallel lay.

7. The improvement as set forth in claim 6 wherein said composite structure further includes longitudinally oriented aramid fibers.

8. The improvement as set forth in claim 7 wherein said aramid fibers are helically wound.

9. The improvement as set forth in claim 1 wherein said composite structure further includes longitudinally oriented glass fibers.

10. The improvement as set forth in claim 9 wherein said glass fibers are helically wound.

11. The improvement as set forth in claim 1 wherein said carbon fibers have a low pitch angle helical wind.

12. The improvement as set forth in claim 1 wherein said resin matrix is a thermoset resin.

13. The improvement as set forth in claim 1 wherein said resin matrix is a thermoplastic resin.

14. The improvement as set forth in claim 1 wherein said carbon fibers have an elastic modulus in excess of 30 million psi.

* * * * *

UNITED STATES PATENT AND TRADEMARK OFFICE
CERTIFICATE OF CORRECTION

PATENT NO. : 4,589,801

DATED : May 20, 1986

INVENTOR(S) : Mamdouh M. Salama

It is certified that error appears in the above-identified patent and that said Letters Patent are hereby corrected as shown below:

Column 5, line 39, delete "tensioned axially" and insert --axially tensioned--.

Column 6, line 3, delete "mooring elements axially tensioned" and insert --axially tensioned mooring elements--.

Column 6, line 8, delete "mooring elements axially tensioned" and insert --axially tensioned mooring elements--.

Column 6, line 12, delete "mooring elements axially tensioned" and insert --axially tensioned mooring elements--.

Signed and Sealed this

Nineteenth Day of August 1986

[SEAL]

Attest:

DONALD J. QUIGG

Attesting Officer

Commissioner of Patents and Trademarks